(12) United States Patent
Chen et al.

(10) Patent No.: US 8,701,036 B2
(45) Date of Patent: Apr. 15, 2014

(54) ELECTRONIC DEVICE AND METHOD FOR IMPLEMENTING ICON BOARD BASED OPERATION INTERFACE THEREOF

(75) Inventors: Li-Hsuan Chen, New Taipei (TW); Yu-Chi Chang, New Taipei (TW); Hung-Yang Hsu, New Taipei (TW)

(73) Assignee: Wistron Corporation, New Taipei (TW)

( * ) Notice: Subject to any disclaimer, the term of this patent is extended or adjusted under 35 U.S.C. 154(b) by 143 days.

(21) Appl. No.: 13/171,386

(22) Filed: Jun. 28, 2011

(65) Prior Publication Data

US 2012/0047456 A1    Feb. 23, 2012

(30) Foreign Application Priority Data

Aug. 17, 2010   (TW) ................................ 99127469 A

(51) Int. Cl.
*G06F 3/00*     (2006.01)
*G06F 17/00*    (2006.01)

(52) U.S. Cl.
USPC .......................................................... 715/781

(58) Field of Classification Search
USPC .......................................................... 715/781
See application file for complete search history.

(56) References Cited

U.S. PATENT DOCUMENTS

| | | | |
|---|---|---|---|
| 6,621,532 B1* | 9/2003 | Mandt | 348/841 |
| 6,667,751 B1* | 12/2003 | Wynn et al. | 715/833 |
| 7,319,778 B2* | 1/2008 | Ono | 382/118 |
| 2004/0119755 A1* | 6/2004 | Guibourge | 345/827 |
| 2005/0078868 A1* | 4/2005 | Chen et al. | 382/171 |
| 2005/0108406 A1* | 5/2005 | Lee et al. | 709/228 |
| 2005/0206746 A1* | 9/2005 | Cazier et al. | 348/231.2 |
| 2006/0168101 A1* | 7/2006 | Mikhailov et al. | 709/217 |
| 2006/0236244 A1* | 10/2006 | Coburn et al. | 715/710 |
| 2006/0242234 A1* | 10/2006 | Counts et al. | 709/204 |
| 2007/0011702 A1* | 1/2007 | Vaysman | 725/45 |
| 2007/0132720 A1* | 6/2007 | Kang | 345/156 |
| 2007/0260996 A1* | 11/2007 | Jakobson | 715/781 |
| 2008/0209327 A1* | 8/2008 | Drucker et al. | 715/733 |
| 2008/0276200 A1 | 11/2008 | Bamford et al. | |

(Continued)

FOREIGN PATENT DOCUMENTS

| | | |
|---|---|---|
| CN | 101299178 A | 11/2008 |
| TW | 200844815 | 11/2008 |

OTHER PUBLICATIONS

Dynamic Versus Static Menu: An Exploratory Comparison by Jeffery Mitchell and Ben Schneiderman published by SIGCHI (1989).*

(Continued)

*Primary Examiner* — William Bashore
*Assistant Examiner* — Nathan Shrewsbury
(74) *Attorney, Agent, or Firm* — Jianq Chyun IP Office

(57) ABSTRACT

An electronic device and a method for implementing an icon board based operation interface thereof are provided. In the method, a plurality of areas within a screen frame on a screen of the electronic device are arranged for respectively displaying a plurality of function boards, in which each of the function boards is corresponding to one of a plurality of main functions supported by the electronic device. For each main function including at least one sub-function, a sub-function icon thereof is generated according to a relevant historical operating information, and a main function icon of the main function and the sub-function icon of each sub-function are displayed together on the function board of the main function.

12 Claims, 2 Drawing Sheets

(56) References Cited

U.S. PATENT DOCUMENTS

| | | | |
|---|---|---|---|
| 2008/0313567 A1* | 12/2008 | Sabin et al. | 715/835 |
| 2009/0066726 A1* | 3/2009 | Kato et al. | 345/639 |
| 2009/0100439 A1* | 4/2009 | McNeil | 719/313 |
| 2009/0204929 A1* | 8/2009 | Baurmann et al. | 715/836 |
| 2010/0026706 A1* | 2/2010 | Yamaji et al. | 345/594 |
| 2010/0094915 A1* | 4/2010 | Woodall et al. | 707/805 |
| 2010/0097398 A1* | 4/2010 | Tsurumi | 345/634 |
| 2010/0185986 A1* | 7/2010 | Quintanilla et al. | 715/835 |
| 2010/0201646 A1* | 8/2010 | Sakai et al. | 345/173 |
| 2010/0318500 A1* | 12/2010 | Murphy et al. | 707/693 |
| 2011/0179483 A1* | 7/2011 | Paterson et al. | 726/22 |
| 2011/0181603 A1* | 7/2011 | Liang et al. | 345/473 |
| 2011/0285748 A1* | 11/2011 | Slatter et al. | 345/629 |
| 2012/0011544 A1* | 1/2012 | Vaysman et al. | 725/38 |
| 2012/0278746 A1* | 11/2012 | Jetha et al. | 715/770 |
| 2012/0281102 A1* | 11/2012 | Takahashi | 348/207.1 |

OTHER PUBLICATIONS

"First Office Action of China Counterpart Application" with English translation thereof, issued on Sep. 12, 2013, p. 1-p. 13.

"Office Action of Taiwan Counterpart Application", issued on Aug. 15, 2013, with English translation thereof, p. 1-p. 8.

\* cited by examiner

ELECTRONIC DEVICE AND METHOD FOR IMPLEMENTING ICON BOARD BASED OPERATION INTERFACE THEREOF

CROSS-REFERENCE TO RELATED APPLICATION

This application claims the priority benefit of Taiwan application serial no. 99127469, filed Aug. 17, 2010. The entirety of the above-mentioned patent application is hereby incorporated by reference herein and made a part of this specification.

BACKGROUND OF THE INVENTION

1. Field of the Invention

The invention relates to a method for implementing an operation interface, and in particular to a method for implementing an icon board based operation interface, and an electronic device adopting the method thereof.

2. Description of Related Art

As technology advances, electronic products are gradually moving toward multifunctionality. For example, except for watching TV channels, a multifunction TV supports playing various multimedia formats such as movies, music and photos, tuning in radio broadcast, and connecting to the Internet.

In general, most electronic products featuring multiple functions provide a hierarchical menu to users for selection of functions to be executed. The hierarchical menus of multifunction electronic products on market often display options of main functions on the main screen. Upon selection of a main function by the user, a menu of next level of the selected main function is displayed. Selection of an option in the next-level menu may execute the corresponding function or enter a sub-menu.

It is not difficult to realize the difficulties of users not familiar with a product to memorize and be in control of the locations of all function options. Moreover, they have to frequently switch between menus of different hierarchy levels in search of the functions needed. Such complex operating procedures not only lower operation efficiency of the electronic products, but also negatively influence the users' impressions on the operation of the electronic products.

SUMMARY OF THE INVENTION

In light of the above, the invention provides a method for implementing an icon board based operation interface, which generates an icon board based operation interface to offer users more information about the functions supported by the electronic device, so as to facilitate operation of the electronic device.

The invention provides a electronic device, wherein an icon board based operation interface thereof helps users quickly gain control and operate efficiently all main functions and frequently used sub-functions.

The invention provides a method for implementing an icon board based operation interface which is used in an electronic device having a screen, wherein the electronic device supports a plurality of main functions, and each of the main functions includes at least one sub-function. A plurality of areas are arranged within a screen frame on the screen for respectively displaying function boards of the main functions. For each of the main functions, a sub-function icon of each of the sub-functions included in the main function is generated according to a historical operating information of each sub-function, and the main function icon and the sub-function icon of each of the sub-functions are displayed together on the corresponding function board.

In an embodiment of the invention, wherein a usage frequency of each sub-function is higher than a threshold value.

In another embodiment of the invention, the step of generating the sub-function icon according to the historical operating information of the sub-function includes determining whether the historical operating information of the sub-function is stored in the storage unit of the electronic device. If yes, the sub-function icon corresponding to the historical operating information is generated. If not, a default icon is used as the sub-function icon.

In one embodiment of the invention, after the step of determining whether the historical operating information of the sub-function is stored in the storage unit of the electronic device, the method further includes a step of accessing a database to obtain a further information related to the historical operating information, and displaying the further information on the function board.

In one embodiment of the invention, the main function icon comprises at least one of a text and an image corresponding to a title of the main function.

In one embodiment of the invention, after the step of displaying the main function icon and the sub-function icon of each the sub-function together on the function board for each of the main functions, the method further comprises executing the sub-function corresponding to the sub-function icon when receiving a selection instruction exerted on the sub-function icon, and updating at a specific moment the historical operating information of the sub-function according to an execution result.

In one embodiment of the invention, after the step of displaying the main function icon and the sub-function icon of each sub-function together on the function board for each of the main functions, the method further comprises displaying a sub-function menu of the main function corresponding to the main function icon when receiving a selection instruction exerted on the main function icon.

In one embodiment of the invention, the method further comprises arranging the areas within the screen frame for respectively displaying the function board of each of the main functions when powering on the electronic device or receiving an instruction of displaying the operation interface.

In one embodiment of the invention, wherein each of the function boards is a two-dimensional function board or a three-dimensional function board.

From another point of view, the invention provides an electronic device comprising a screen, a processing unit, and an operation interface implementation module. The processing unit is coupled to the screen to provide a plurality of main functions, in which each of the main functions respectively includes at least one sub-function. The operation interface implementation module is coupled to the screen and the processing unit. The operation interface implementation module is configured to arrange a plurality of areas within a screen frame on the screen for respectively displaying a function board of each of the main functions. For each of the main functions, the operation interface implementation module generates a sub-function icon of each sub-function according to a historical operating information of each sub-function, and the main function icon and the sub-function icon of each sub-function are displayed together on the function board of the main function.

In one embodiment of the invention, the electronic device further includes a storage unit, which is coupled to the operation interface implementation module and the processing unit. For each sub-function, the operation interface implementation module generates the sub-function icon corresponding to the relevant historical operating information if the historical operating information is stored in the storage unit, and uses a default icon as the sub-function icon if the historical operating information is not stored in the storage unit.

In one embodiment of the invention, the operation interface implementation module accesses a database to obtain a further information related to the historical operating information of the sub-function if the historical operating information is stored in the storage unit, and displays the further information on the function board.

In one embodiment of the invention, the processing unit executes the sub-function corresponding to the sub-function icon when receiving a selection instruction exerted on the sub-function icon, updates at a specific moment the historical operating information of the sub-function according to an execution result, and stores the updated historical operating information into the storage unit.

In an embodiment of the invention, when receiving a selection instruction exerted on the main function icon, the processing unit displays a sub-function menu of the main function corresponding to the main function icon.

Based on the above description, the invention displays function boards of all main functions included in the electronic device on the screen, and it also displays on each function board the icon of the corresponding main function and the icons of at least part of the sub-functions associated to that main function, so as to assist the users to take full control of the relationship between most functions through the function boards displayed on the screen and thereby facilitate the operation of the electronic device.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
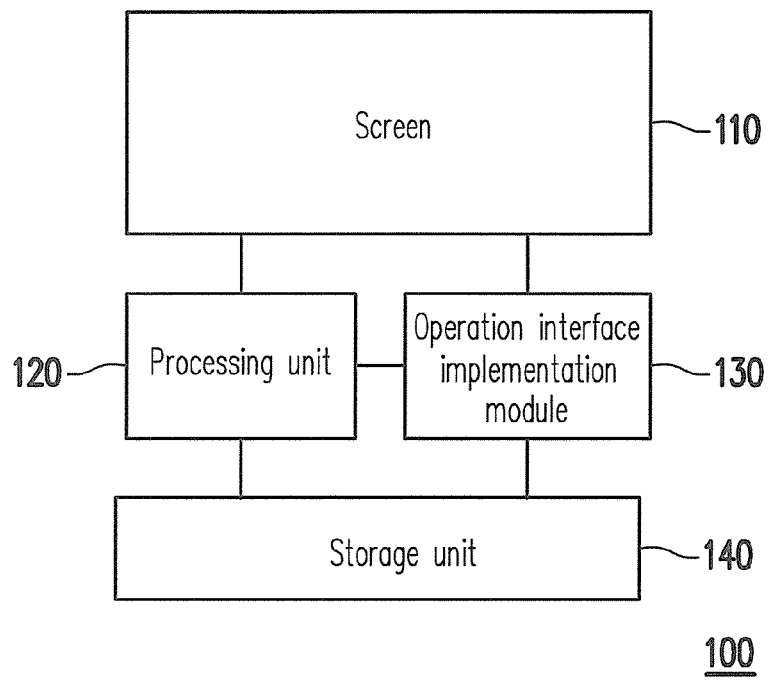
FIG. 1 is a block diagram of an electronic device according to an embodiment of the invention.

FIG. 1 is a block diagram of an electronic device according to an embodiment of the invention. As shown in FIG. 1, an electronic device 100 includes a screen 110, a processing unit 120, an operation interface implementation module 130, and a storage unit 140. In the present embodiment, the electronic device 100 is, for example, a consumer electronic device, but the type of the electronic device 100 is not limited herein.

The screen 110 can be a liquid crystal display (LCD), a plasma display, a vacuum fluorescent display, a light-Emitting diode (LED) display, or a field emission display, which is used to display the frames generated during operation of the electronic device 100.

The processing unit 120 is coupled to the screen 110. The processing unit 120 can be an embedded processor, which is used to control overall operations of the electronic device 100. Specifically, the processing unit 120 provides a plurality of main functions to endow multi-functionality to the electronic device 100, wherein each of the main functions respectively includes at least one sub-function for selection by the users.

The operation interface implementation module 130 is coupled to the screen 110 and the processing unit 120, while the storage unit 140 (e.g., a flash memory) is coupled to the operation interface implementation module 130 and the processing unit 120. In the present embodiment, the operation interface implementation module 130 may be implemented by software instructions and stored in a computer accessible storage media such as a compact disk, a flash memory, or a hard drive, and the function thereof is executed after the software instructions are loaded into a memory of the electronic device 100. In addition, the operation interface implementation module 130 may be implemented by hardware such as logic gates or integrated circuits.

In the embodiment, the storage unit 140 stores a usage log of a user while he/she is using the electronic device 100, and after obtaining the main functions and the sub-functions included therein by the processing unit 120, the operation interface implementation module 130 generates an icon board based operation interface in accordance with the usage log stored in the storage unit 140. In the icon board based operation interface, each of the main functions of the electronic device 100 is displayed as a function board. Each function board not only displays the main function icon, but also displays the sub-function icons corresponding to part or all of the sub functions included in the main function. The sub-function icons are continuously updated according to utilization profiles of the users, so the users are able to quickly get a hand on the relations between main functions and sub-functions, and obtain more information regarding the operation of the sub-functions.

In order to describe steps of implementing an icon board based operation interface by the operation interface implementation module 130 in more detail, another embodiment will be illustrated as follows to further describe the invention. In the present embodiment, each of the main functions provided by the processing unit 120 comprises a plurality of sub-functions, wherein a usage frequency of each sub-function may be obtained by usability tests. For convenience of description, the sub-functions hereafter are frequently used sub-functions with a usage frequency higher than a threshold value.

Figure 2:
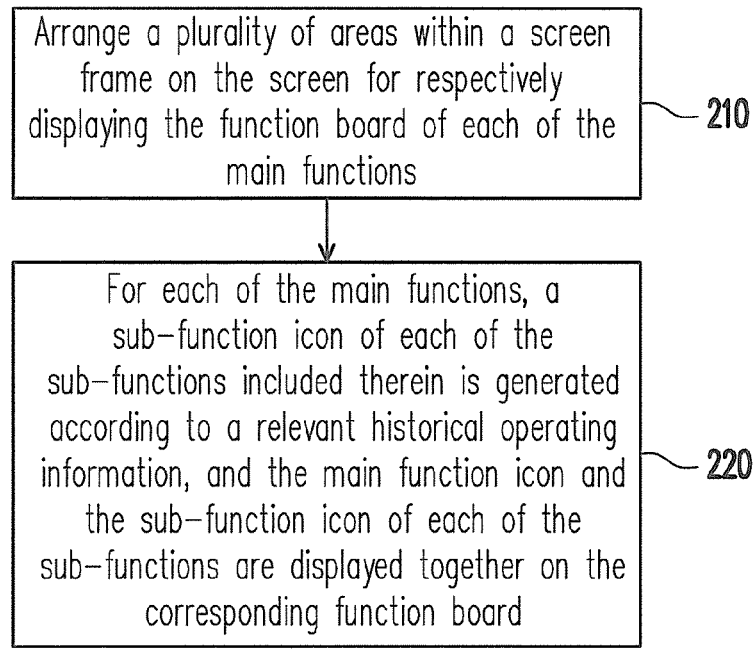
FIG. 2 is a flowchart of the method for implementing an icon board based operation interface according to an embodiment of the invention.

FIG. 2 is a flowchart of the method for implementing an icon board based operation interface according to an embodiment of the invention. Please refer to FIG. 1 and FIG. 2 concurrently. When an electronic device 100 is powered on, or when an instruction of displaying the operation interface triggered by the user through a remote control (or other input devices) is received by the electronic device 100, in a step 210, a plurality of areas are arranged within a screen frame on the screen 110 by the operation interface implementation module 130, so as to respectively display a function board of each of the main functions. In one embodiment, the appearance of the function boards may be two-dimensional function boards with rectangular, circular, polygonal, or irregular shape. In another embodiment, the function boards may be three-dimensional function boards and render the effects of three-dimensional annular display or depth of view.

After the locations of the function board of each of the main functions are arranged, the contents of each function board have to be determined. In a step 220, for each main function, a sub-function icon of each sub-function included in the main function is generated by the operation interface implementation module 130 according to a relevant historical operating information, and the icon of the main function and the icons of sub-functions are displayed together on the function board of the main function.

Figure 3:
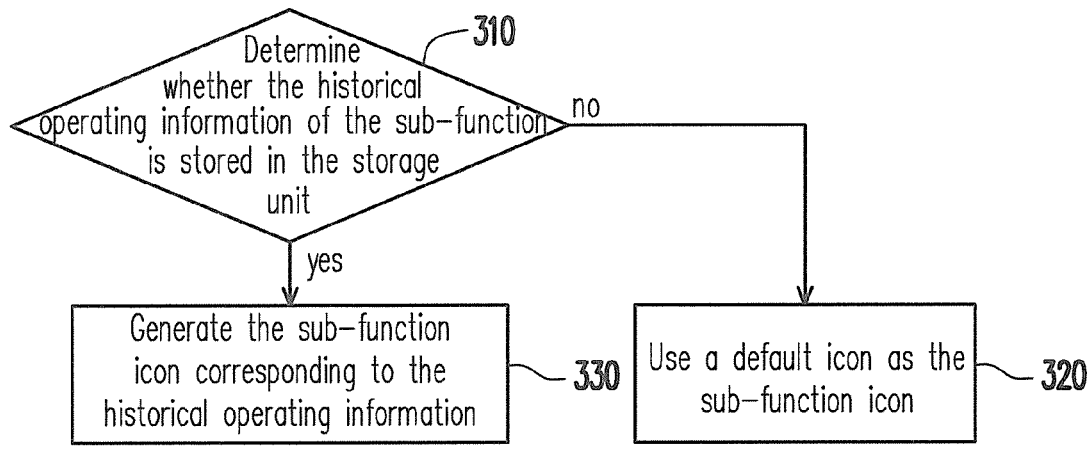
FIG. 3 is a flow chart of generating a sub-function icon according to an embodiment of the invention.

In the present embodiment, the icon of each of the main functions is, for example, stored in the storage unit 140 and includes a text and/or an image corresponding to a title of the main function. Detailed steps of generating the sub-function icons by the operation interface implementation module 130 are illustrated with reference to FIG. 3 as follows. First, in a step 310, when the operation interface implementation module 130 is about to generate a sub-function icon of a sub-function, the operation interface implementation module 130 determines whether the historical operating information of the sub-function is stored in the storage unit 140.

If the historical operating information of the sub-function is not stored in the storage unit 140, which indicates that the user has never accessed the sub-function. As shown in a step 320, the operation interface implementation module 130 uses a default icon to serve as the sub-function icon. The default icon is, for example, stored in the storage unit 140 and consists of texts and/or images in representation of the title of the sub-function.

If the historical operating information of the sub-function is stored in the storage unit 140, which indicates that the user has accessed the sub-function. As shown in a step 330, the operation interface implementation module 130 generates a sub-function icon corresponding to the historical operating information.

In one embodiment, if the historical operating information of the sub-function is an image, the operation interface implementation module 130 uses the image to serve as the sub-function icon. For example, if the main function "movie" supported by the electronic device 100 has a sub-function of playing movies, and the relevant historical operating information stored in the storage unit 140 is a thumbnail image (e.g., a cover or a screen shot) of the movie played last time, the operation interface implementation module 130 uses the thumbnail image as the icon of the sub-function of playing movies. Furthermore, if the main function "photo" has a sub-function of browsing photos, and the relevant historical operating information stored in the storage unit 140 is several photos that the user recently browsed. The operation interface implementation module 130 combines these photos into one thumbnail picture, and regards the thumbnail picture as an icon of the sub-function of browsing photos.

In another embodiment, if the historical operating information of a sub-function is texts, the operation interface implementation module 130 combines the texts with a default background image to generate a sub-function icon. For example, the main function "TV" supported by the electronic device 100 has a sub-function of selecting channels, and if the relevant historical operating information stored in the storage unit 140 is the last channel viewed by the user, then the channel is added on the default background image by the operation interface implementation module 130 to generate the icon of the sub-function of selecting TV channels.

In yet another embodiment, when the historical operating information includes texts and images, the texts and images are integrated into a default image template by operation interface implementation module 130 to generate a sub-function icon. For example, the main function "music" has a sub-function of playing an album, and the relevant historical operating information is the title of the last song played by the user and the thumbnail picture of the cover of the album, then the title and the thumbnail picture is integrated by operation interface implementation module 130 and placed in an appropriate location of the default image template, so as to generate the icon for the sub-function of playing an album.

The sub-function icon generated by the operation interface implementation module 130 reflects the historical operating information of the related sub-function, so that the user may get the previous operation state about the sub-function by checking the sub-function icon. It should be noted that the aforementioned embodiments are for convenience of description only, and the approaches generating a sub-function icon by the operation interface implementation module 130 according to the historical operating information of the sub-function is not limited herein, neither is the method for implementing the appearance of the sub-function icon.

In another embodiment of the invention, when the operation interface implementation module 130 determines that the historical operating information of a sub-function is stored in the storage unit 140, the operation interface implementation module 130 obtains a further information related to the historical operating information by accessing a database, and displays the further information on the function board. For example, if a main function "TV" is supported by the electronic device 100, and it comprises a sub-function of selecting channels, when the channel last viewed by the user is stored in the storage unit 140 to serve as the historical operating information, the operation interface implementation module 130 gets the program currently played on this channel by accessing a remote database through a network device (not shown) of the electronic device 100, and serves the program as the further information. In another embodiment, the operation interface implementation module 130 may access a local database in order to retrieve the further information. However, the location of the database is not limited herein.

When the contents to be displayed on the function board of each of the main functions are being determined by the operation interface implementation module 130, the sub-function icon of each sub-function corresponding to the main function can be generated by the foregoing approach, and the main function icon and the sub-function icons are displayed on the function board of the main function together, such that implementation of a icon board based operation interface is accomplished.

Figure 4:
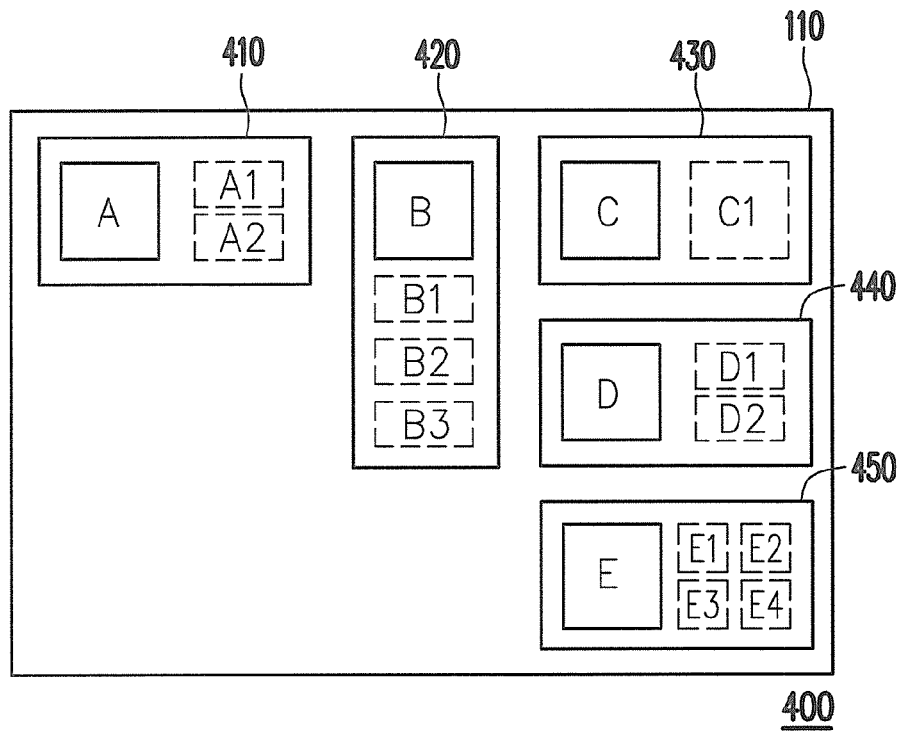
FIG. 4 is a schematic view of an icon board based operation interface according to one embodiment of the invention.

In the following embodiment, it is assumed that the electronic device 100 includes five main functions, and the icon board based operation interface implemented by the operation interface implementation module 130 is an icon board based operation interface 400 as shown in FIG. 4. Refer to FIG. 4, the screen frame on the screen 110 includes function boards 410-450 respectively corresponding to the five main functions. In which, a main function icon A, a sub-function icon A1, and a sub-function icon A2 are displayed on a function board 410. A main function icon B, a sub-function icon B1, a sub-function icon B2, and a sub-function icon B3 are displayed on a function board 420. A main function icon C and a sub-function icon C1 are displayed on a function board 430. A main function icon D, a sub-function icon D1, and a sub-function icon D2 are displayed on a function board 440. A main function icon E, a sub-function icon E1, a sub-function icon E2, a sub-function icon E3 and a sub-function icon E4 are displayed on a function board 450.

The function boards 410-450 on the icon based operation interface 400 not only directly display the information needed by the user (e.g., the hierarchical relations between main functions and sub-functions, or the usage log of sub-functions), but also can accept operations by the user through a remote control or a similar input device, such that corresponding actions are taken by the electronic device 100. For example, when a selection instruction exerted on the sub-function icon A1 is received by the processing unit 120, the sub-function corresponding to the sub-function icon A1 is executed. Besides, the historical operating information of each of the sub-functions is updated at specific moment (e.g., completion of the sub-function, powering off the electronic device 100, or at a default time interval) by the processing unit 120 according to an execution result of sub-function, in which the updated historical operating information is stored in the storage unit 140. In other words, all sub-function icons displayed on the icon board based operation interface 400 are capable of accepting the selecting actions from the user and enabling the electronic device 100 to execute the corresponding functions. Compared to a conventional interface using hierarchical menus, the icon board based operation interface reduces steps of operation for function selection, so as to improve operational efficiency of the electronic device 100.

In another embodiment, because the function board may not be able to display all icons of all sub-functions included in the corresponding main function, the user can click on the main function icon on the function board through a remote control (or other input devices) when he/she wants to select the associated sub-functions. When receiving a selection instruction exerted on the main function icon, a complete sub-function menu of the selected main function is displayed by the processing unit 120 on the screen 110, so as to enable the user to select a sub-function. For example, assume that the main function corresponding to the function board 420 has 10 sub-functions, in which only sub-function icons B1-B3 corresponding to three frequently used sub-functions are displayed on function board 420. When the user wants to select a function other than these three sub-functions, the user may click the main function icon B by using a remote control to launch a complete sub-function menu of the main function corresponding to the function board 420, and select the needed sub-function from the sub-function menu.

To sum up, the electronic device and the method for implementing a icon based operation interface thereof display on the screen frame all main functions supported by the electronic device and at least one sub-function included in each of the main functions by virtue of function boards. The invention helps the user quickly gain control of hierarchical relations between main functions and sub-functions and obtain more information by just looking at the function boards, and it also enables the user to select desired functions directly from the function boards, so as to reduce steps of operation for function selection and improve operational efficiency of the electronic device.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method for implementing an icon board based operation interface, used in an electronic device comprising a screen, wherein the electronic device supports a plurality of main functions, each of the main functions comprising at least one sub-function, the method comprising:

arranging a plurality of areas within a screen frame on the screen for respectively displaying a function board for each of the main functions;

for each of the main functions, determining whether most current operating information of the at least one sub-function is stored in a storage unit of the electronic device;

generating a sub-function icon according to the most current operating information, wherein the sub-function icon includes a text or an image when the most current operating information of the at least one sub-function is stored in the storage unit of the electronic device, and using a default icon as the sub-function icon when the most current operating information of the sub-function is not stored in the storage unit of the electronic device;

for each of the main functions, displaying a main function icon of the main function and the sub-function icon of each of the at least one sub-function together on the function board of the main function.

2. The method for implementing the icon board based operation interface of claim 1, wherein a usage frequency of each of the at least one sub-function is higher than a threshold value.

3. The method for implementing the icon board based operation interface of claim 1, wherein after the step of determining whether the most current operating information of the at least one sub-function is stored in the storage unit, the method further comprises:

if yes, accessing a database to obtain further information related to the most current operating information; and displaying the further information on the function board.

4. The method for implementing the icon board based operation interface of claim 1, wherein the main function icon comprises at least one of a text and an image corresponding to a title of the main function.

5. The method for implementing an icon board based operation interface of claim 1, after the step of displaying the main function icon and the sub-function icon of each of the least one sub-function together on the function board for each of the main functions, the method further comprises:

when receiving a selection instruction exerted on the sub-function icon, executing the sub-function corresponding to the sub-function icon; and updating at a specific moment the most current operating information of the sub-function according to an execution result.

6. The method for implementing an icon board based operation interface of claim 1, wherein after the step of displaying the main function icon and the sub-function icon of each of the least one sub-function together on the function board for each of the main functions, the method further comprises:

when receiving a selection instruction exerted on the main function icon, displaying a sub-function menu of the main function corresponding to the main function icon.

7. The method for implementing an icon board based operation interface of claim 1, wherein the method further comprises:

when powering on the electronic device or receiving an instruction of displaying the operation interface, arranging the areas within the screen frame for respectively displaying the function board of each of the main functions.

8. The method for implementing an icon board based operation interface of claim 1, wherein the function board is a two-dimensional function board or a three-dimensional function board.

9. An electronic device, comprising:
a screen;
a processing unit, coupled to the screen to provide a plurality of main functions, wherein each of the main functions respectively comprises at least one sub-function; and
an operation interface implementation module, coupled to the screen and the processing unit to arrange a plurality of areas within a screen frame on the screen for respectively displaying a function board for each of the main functions;
a storage unit, coupled to operation interface implementation module and the processing unit,
wherein for each of the main functions, the operation interface implementation module determines whether most current operating information of the at least one sub-function is stored in the storage unit of the electronic device,
wherein when the most current operating information of the at least one sub-function is stored in the storage unit of the electronic device, the operation interface implementation module generates a sub-function icon according to the most current operating information, wherein the sub-function icon includes a text or an image,
wherein when the most current operating information of the sub-function is not stored in the storage unit of the electronic device, the operation interface implementation module uses a default icon as the sub-function icon,
wherein for each of the main functions, the operation interface implementation module displays a main function icon of the main function and the sub-function icon of each of the at least one sub-function together on the function board of the main function.

10. The electronic device as claimed in claim 9, wherein the operation interface implementation module accesses a database to obtain further information related to the most current operating information if the most current operating information is stored in the storage unit, and displays the further information on the function board.

11. The electronic device as claimed in claim 9, wherein the processing unit executes the sub-function corresponding to the sub-function icon when receiving a selection instruction exerted on the sub-function icon, updates at a specific moment the most current operating information of the sub-function according to an execution result, and stores the updated most current operating information into the storage unit.

12. The electronic device as claimed in claim 9, wherein when receiving a selection instruction exerted on the main function icon, the processing unit displays a sub-function menu of the main function corresponding to the main function icon.

* * * * *